United States Patent
Kim et al.

(10) Patent No.: US 9,385,375 B2
(45) Date of Patent: Jul. 5, 2016

(54) POSITIVE ELECTRODE FOR RECHARGEABLE LITHIUM BATTERY AND RECHARGEABLE LITHIUM BATTERY INCLUDING SAME

(71) Applicant: Samsung SDI Co., Ltd., Yongin-si, Gyeonggi-Do (KR)

(72) Inventors: Hee-Joong Kim, Yongin-si (KR); Joon-Hyung Lee, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 201 days.

(21) Appl. No.: 14/057,766

(22) Filed: Oct. 18, 2013

(65) Prior Publication Data

US 2015/0010827 A1 Jan. 8, 2015

(30) Foreign Application Priority Data

Jul. 3, 2013 (KR) .................. 10-2013-0077912

(51) Int. Cl.
*C01B 25/45* (2006.01)
*H01M 10/0525* (2010.01)
*H01M 4/131* (2010.01)
*H01M 4/36* (2006.01)
*H01M 4/62* (2006.01)

(52) U.S. Cl.
CPC ............. *H01M 4/628* (2013.01); *C01B 25/45* (2013.01); *H01M 4/131* (2013.01); *H01M 4/366* (2013.01); *H01M 10/0525* (2013.01); *Y02E 60/122* (2013.01)

(58) Field of Classification Search
CPC ....... H01M 4/62; H01M 4/628; H01M 4/366; H01M 4/131; H01M 10/0525; C01B 25/45
See application file for complete search history.

(56) References Cited

U.S. PATENT DOCUMENTS

| | | | | |
|---|---|---|---|---|
| 8,338,018 B2* | 12/2012 | Lee | ..................... | H01M 2/1646 429/129 |
| 8,343,388 B2* | 1/2013 | Lee | ......................... | H01M 4/02 252/519.12 |
| 8,383,268 B2 | 2/2013 | Inda | | |
| 2003/0180605 A1* | 9/2003 | Mizutani | ............... | H01M 2/021 429/94 |
| 2004/0096743 A1* | 5/2004 | Okae | ...................... | H01M 4/131 429/231.1 |
| 2005/0266150 A1* | 12/2005 | Yong | ...................... | H01M 2/166 427/58 |
| 2008/0311479 A1* | 12/2008 | Lee | ......................... | H01M 4/13 429/232 |

(Continued)

FOREIGN PATENT DOCUMENTS

| | | |
|---|---|---|
| JP | 08-153513 A | 6/1996 |
| JP | 2010-257988 A | 11/2010 |

(Continued)

OTHER PUBLICATIONS

Kunshina, synthesis and ionic conductivity of lithium-conducting titanium phosphate solid electrolytes, 2004, Russian Journal of Applied Chemistry, vol. 77, pp. 929-934.*
Doctor Peterson, Math Forum at Drexel, Jul. 3, 2005.*

*Primary Examiner* — Sarah A Slifka
*Assistant Examiner* — Brian Ohara
(74) *Attorney, Agent, or Firm* — Knobbe Martens Olson & Bear LLP

(57) ABSTRACT

In an aspect, a positive electrode for a rechargeable lithium battery including a current collector, a positive active material layer disposed on the current collector, and a coating layer disposed on the positive active material layer is disclosed.

7 Claims, 5 Drawing Sheets

(56) References Cited

U.S. PATENT DOCUMENTS

2012/0015234 A1 1/2012 Iwaya et al.
2012/0088163 A1* 4/2012 Ryu .................. C03C 10/0027
429/405

FOREIGN PATENT DOCUMENTS

| KR | 10-2004-0047664 A | 6/2004 |
| KR | 10-2010-0004025 A | 1/2010 |
| KR | 10-2011-0106342 A | 9/2011 |

* cited by examiner

POSITIVE ELECTRODE FOR RECHARGEABLE LITHIUM BATTERY AND RECHARGEABLE LITHIUM BATTERY INCLUDING SAME

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0077912 filed in the Korean Intellectual Property Office on Jul. 3, 2013, the disclosure of which is incorporated herein by reference in its entirety.

BACKGROUND

1. Field

This disclosure relates to a positive electrode for a rechargeable lithium battery and a rechargeable lithium battery including the same.

2. Description of the Related Technology

Recently, research on rechargeable lithium batteries having high energy density for power source of portable electronic devices have been actively undertaken due to reductions in size and weight of portable electronic equipment, and popularization of portable electronic devices.

A rechargeable lithium battery is manufactured using materials for negative and positive electrodes that intercalate or deintercalate lithium ions, and filing an organic electrolyte solution or a polymer electrolyte that transfer lithium ions between the positive and negative electrodes.

A rechargeable lithium battery may use a lithium metal as a negative active material, but dendrite formation on the surface of the lithium metal during charge and discharge is possible and may cause a battery short circuit and battery destruction. In order to solve this problem, a carbon-based material reversibly receiving and supplying lithium ions as well as maintaining a structure and electric property and having a similar half-cell potential to a lithium metal during intercalation/deintercalation of lithium ions has been widely used as a negative active material.

For a positive active material of a rechargeable lithium battery, metal chalcogenide compounds being capable of intercalating and deintercalating lithium ions, and for example, composite metal oxide such as $LiCoO_2$, $LiMn_2O_4$, $LiNiO_2$, $LiNi_{1-x}Co_xO_2$ ($0<x<1$), $LiMnO_2$, and the like has been used. $LiNiO_2$ among the positive active materials has high charge capacity but is difficult to synthesize, while a Mn-based active material such as $LiMn_2O_4$, $LiMnO_2$, and the like is easy to synthesize, and relatively inexpensive but have relatively small capacity. In addition, the $LiCoO_2$ shows electrical conductivity of about $10^{-2}$ S/cm to 1 S/cm at room temperature, high battery voltage, and excellent electrode characteristics and thus, has been widely used but has low stability during high-rate charge and discharge.

In general, these composite metal oxides are prepared in a solid-phase reaction method of mixing raw powders in a solid state and firing the mixture. For example, $LiNi_{1-x}Co_xO_2$ ($0<x<1$) may be prepared by mixing $Ni(OH)_2$ with $Co(OH)_2$ or hydroxide containing Ni and Co, then, heat-treating, pulverizing, and filtering $LiNi_{1-x}Co_xO_2$ ($0<x<1$) using sieves, and the like. Another method of preparing composite metal oxides includes forming a crystalline active material by reacting LiOH, Ni oxide, and Co oxide, primarily sintering the reactant to form an initial oxide at 400° C. to 580° C., and secondarily sintering the initial oxide at 600° C. to 780° C.

When active materials prepared using the above methods are used to manufacture a rechargeable lithium battery, the active materials may not maintain main characteristics of the rechargeable lithium battery at a high voltage due to a side reaction with an electrolyte and the like.

SUMMARY

One embodiment provides a positive electrode for a rechargeable lithium battery that has excellent high-rate charge and discharge characteristics and cycle-life characteristics as well as high safety.

Another embodiment provides a rechargeable lithium battery including the positive electrode for a rechargeable lithium battery.

According to one embodiment, a positive electrode for a rechargeable lithium battery includes a current collector, a positive active material layer disposed on the current collector, and a coating layer disposed on the positive active material layer, wherein the coating layer includes a compound represented by Chemical Formula 1.

$$Li_aAl_bTi_c(PO_4)_d \qquad \text{Chemical Formula 1}$$

In the above Chemical Formula 1, $0.1 \leq a \leq 1.2$, $0.35 \leq b \leq 1.2$, $0.1 \leq c \leq 1.6$, and $0.1 \leq d \leq 2.9$.

In the above Chemical Formula 1, a, b, c and d may be in the following ranges: $0.6 \leq a \leq 1.2$, $0.5 \leq b \leq 1.2$, $0.8 \leq c \leq 1.6$, and $0.5 \leq d \leq 2.0$.

In some embodiments, the coating layer may be included in an amount of about 0.1 parts to about 1 part by weight based on 100 parts by weight of the positive active material layer.

In some embodiments, the positive active material layer may include a positive active material, a conductive material, and a binder.

According to another embodiment, a rechargeable lithium battery includes the positive electrode, a negative electrode, and an electrolyte. In some embodiments, the coating layer includes a compound represented by Chemical Formula 1. In some embodiments, the coating layer is included in an amount of about 0.1 parts to about 1 part by weight based on 100 parts by weight of the positive active material layer. In some embodiments, the positive active material layer comprises a positive active material, a conductive material, and a binder. In some embodiments, the coating layer includes $LiAlTi(PO_4)$.

The positive electrode according to one embodiment may realize a rechargeable lithium battery having excellent high-rate charge and discharge characteristics and cycle-life characteristics as well as high safety.

DETAILED DESCRIPTION

Figure 1:
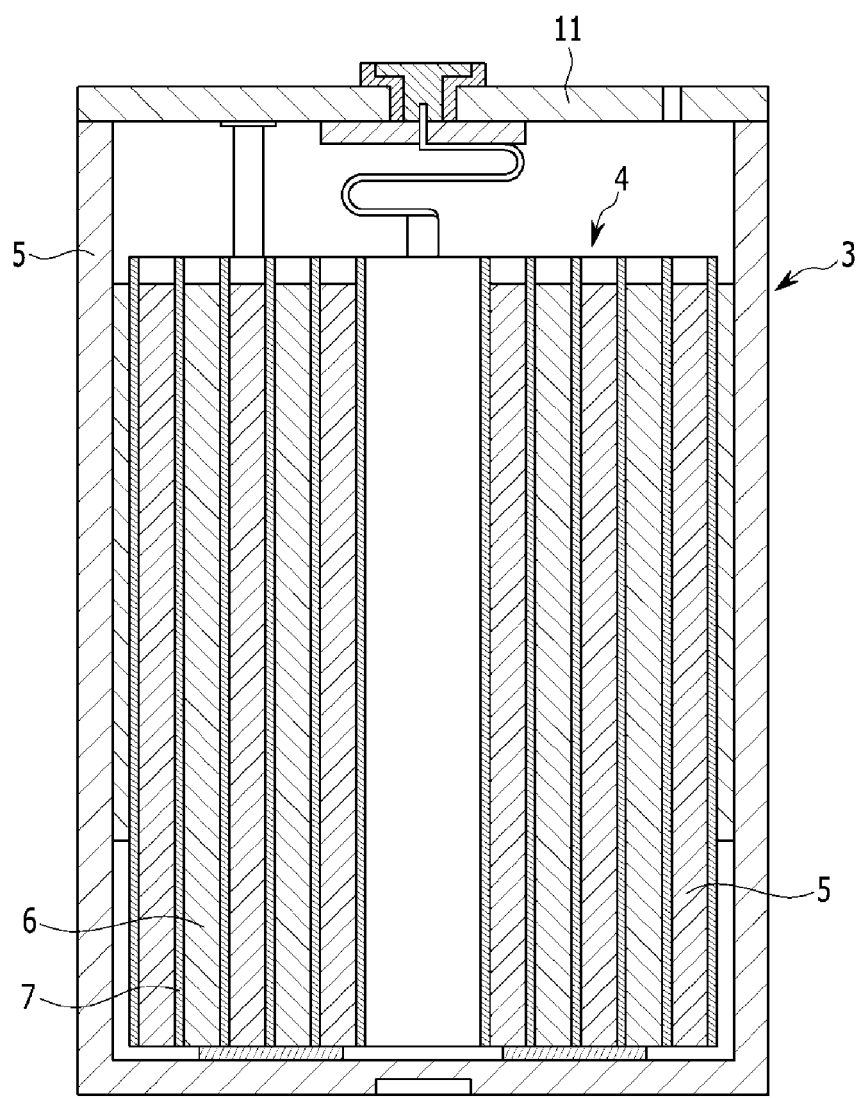
FIG. 1 is a schematic view showing a rechargeable lithium battery according to one embodiment.

Hereinafter, embodiments of the present disclosure are described in detail. However, these embodiments are exemplary, and this disclosure is not limited thereto.

A positive electrode for a rechargeable lithium battery according to one embodiment includes a current collector, a positive active material layer disposed on the current collector, and a coating layer disposed on the positive active material layer, wherein the coating layer includes a compound represented by Chemical Formula 1.

$$Li_aAl_bTi_c(PO_4)_d \quad \text{Chemical Formula 1}$$

In the above Chemical Formula 1, $0.1 \le a \le 1.2$, $0.35 \le b \le 1.2$, $0.1 \le c \le 1.6$, and $0.1 \le d \le 2.9$.

The coating layer including the compound represented by the above Chemical Formula 1 coats the positive active material layer, and thus prevents the positive active material layer from contacting an electrolyte directly. Therefore, a side reaction caused by direct contact of the positive active material layer with an electrolyte may be suppressed, and thereby battery characteristics may be improved.

In some embodiments, the a, b, c and d may be in the following ranges: $0.1 \le a \le 1.2$, $0.35 \le b \le 1.2$, $0.1 \le c \le 1.6$, and $0.1 \le d \le 2.9$, specifically $0.6 \le a \le 1.2$, $0.5 \le b \le 1.2$, $0.8 \le c \le 1.6$ and $0.5 \le d \le 2.0$, and more specifically $1.0 \le a \le 1.2$, $1.0 \le b \le 1.2$, $1.0 \le c \le 1.6$ and $1.0 \le d \le 2.0$. In the above Chemical Formula 1, when a, b, c, and d are within the range, optimal electrochemical effects and particularly, excellent high-rate charge and discharge characteristics and cycle-life characteristics at a high voltage and a high temperature may be obtained.

In some embodiments, the coating layer may be included in an amount of about 0.1 parts to about 1 part by weight and specifically about 0.1 parts to about 0.5 parts by weight based on 100 parts by weight of the positive active material layer. When the coating layer is included within the range, discharge capacity of a rechargeable lithium battery may be maximized.

In some embodiments, the coating layer may be formed by coating a coating liquid including the compound represented by Chemical Formula 1 and a solvent, on the positive active material layer. The solvent may be alcohol, such as ethanol, but it is not limited thereto. The coating liquid may have a solid content of 10 wt % to 60 wt %. When the solid content of the coating liquid falls into this range, the uniform coating layer is formed and its viscosity will be suitable for coating.

In some embodiments, the current collector may include Al, but is not limited thereto.

In some embodiments, the positive active material layer may include a positive active material, a conductive material, and a binder.

In some embodiments, the positive active material includes lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae.

$Li_aA_{1-b}R_bD^1_2$ ($0.90 \le a \le 1.8$ and $0 \le b \le 0.5$);

$Li_aE_{1-b}R_bO_{2-c}D^1_c$ ($0.90 \le a \le 1.8$, $0 \le b \le 0.5$ and $0 \le c \le 0.05$);

$Li_aE_{2-b}R_bO_{4-c}D^1_c$ ($0.90 \le a \le 1.8$, $0 \le b \le 0.5$, $0 \le c \le 0.05$);

$Li_aNi_{1-b-c}Co_bR_cD^1_\alpha$ ($0.90 \le a \le 1.8$, $0 \le b \le 0.5$, $0 \le c \le 0.05$ and $0 < \alpha \le 2$);

$Li_aNi_{1-b-c}Co_bR_cO_{2-\alpha}Z_\alpha$ ($0.90 \le a \le 1.8$, $0 \le b \le 0.5$, $0 \le c \le 0.05$ and $0 < \alpha < 2$);

$Li_aNi_{1-b-c}Co_bR_cO_{2-\alpha}Z_2$ ($0.90 \le a \le 1.8$, $0 \le b \le 0.5$, $0 \le c \le 0.05$ and $0 < \alpha < 2$);

$Li_aNi_{1-b-c}Mn_bR_cD^1_\alpha$ ($0.90 \le a \le 1.8$, $0 \le b \le 0.5$, $0 \le c \le 0.05$ and $0 < \alpha \le 2$);

$Li_aNi_{1-b-c}Mn_bR_cO_{2-\alpha}Z_\alpha$ ($9.90 \le a \le 1.8$, $0 \le b \le 0.5$, $0 \le c \le 0.05$ and $0 < \alpha < 2$);

$Li_aN_{1-b-c}Mn_bR_cO_{2-\alpha}Z_2$ ($0.90 \le a \le 1.8$, $0 \le b \le 0.5$, $0 \le c \le 0.05$ and $0 < \alpha < 2$);

$Li_aNi_bE_cG_dO_2$ ($0.90 \le a \le 1.8$, $0 \le b \le 0.9$, $0 \le c \le 0.5$ and $0.001 \le d \le 0.1$);

$Li_aNi_bCo_cMn_dG_eO_2$ ($0.90 \le a \le 1.8$, $0 \le b \le 0.9$, $0 \le c \le 0.5$, $0 \le d \le 0.5$ and $0.001 \le e \le 0.1$);

$Li_aNiG_bO_2$ ($0.90 \le a \le 1.8$ and $0.001 \le b \le 0.1$);

$Li_aCoG_bO_2$ ($0.90 \le a \le 1.8$ and $0.001 \le b \le 0.1$);

$Li_aMnG_bO_2$ ($0.90 \le a \le 1.8$ and $0.001 \le b \le 0.1$);

$Li_aMn_2G_bO_4$ ($0.90 \le a \le 1.8$ and $0.001 \le b \le 0.1$); $QO_2$; $QS_2$; $LiQS_2$; $V_2O_5$; $LiV_2O_5$; $LiTO_2$;

$LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; $D^1$ may be O (oxygen), F (fluorine), S (sulfur), P (phosphorus), or a combination thereof; E may be Co, Mn, or a combination thereof; Z may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; T is Cr, V, Fe, Sc, Y, or a combination thereof; and J may be V, Cr, Mn, Co, Ni, Cu, or a combination thereof.

In some embodiments, the positive active material may include the positive active material with the coating layer, or a compound of the active material and the active material coated with the coating layer. In some embodiments, the coating layer may include a coating element compound, such as an oxide of a coating element, a hydroxide of a coating element, oxyhydroxide of a coating element, oxycarbonate of a coating element, or hydroxycarbonate of a coating element. In some embodiments, the compound for the coating layer may be either amorphous or crystalline. In some embodiments, the coating element included in the coating layer may be Mg, Al, Co, K, Na, Ca, Si, Ti, V, Sn, Ge, Ga, B, As, Zr, or a mixture thereof. In some embodiments, the coating process may include any conventional processes as long as it does not causes any side effects on the properties of the positive active material (e.g., spray coating, immersing), which is well known to persons having ordinary skill in this art, so a detailed description thereof is omitted.

In some embodiments, the conductive material improves conductivity of an electrode. Any electrically conductive material may be used as a conductive material, unless it causes a chemical change. Examples thereof may be natural graphite, artificial graphite, carbon black, acetylene black, ketjen black, a carbon fiber, a metal powder, or a metal fiber such as copper, nickel, aluminum, silver, and the like, and one or more conductive material such as polyphenylene derivative, and the like may be used.

In some embodiments, the binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the above-described positive electrode prevents a direct contact of the coating layer on the surface thereof with an electrolyte and suppresses a side reaction at a high temperature/high voltage. Accordingly, stability of a rechargeable lithium battery may be secured.

In addition, a rechargeable lithium battery including the positive electrode according to one embodiment of the present invention has excellent high rate capability and high battery efficiency.

Hereinafter, a rechargeable lithium battery including the positive electrode is described referring to FIG. 1.

FIG. 1 is a schematic view showing a rechargeable lithium battery according to one embodiment.

Referring to FIG. 1, a rechargeable lithium battery 3 according to one embodiment includes a battery assembly including a positive electrode 5, a negative electrode 6 facing the positive electrode 5, a separator 7 disposed between the positive electrode 5 and negative electrode 6, and an electrolyte (not shown) impregnated in the positive electrode 5, negative electrode 6, and separator 7, a battery case 8 housing the battery assembly, and a cap plate 11 sealing the battery case 8.

In some embodiments, the positive electrode is the same as described above.

In some embodiments, the negative electrode 6 includes a negative current collector and a negative active material layer disposed on the negative current collector.

In some embodiments, the negative current collector may include a copper foil, a nickel foil, stainless steel foil, a titanium foil, a nickel foam, a copper foam, a polymer substrate coated with a conductive metal, or a combination thereof.

In some embodiments, the negative active material layer may include a negative active material, a binder, and optionally a conductive material.

In some embodiments, the negative active material includes a material that reversibly intercalates/deintercalates lithium ions, a lithium metal, a lithium metal alloy, a material being capable of doping/dedoping lithium, or a transition metal oxide.

In some embodiments, the material that reversibly intercalates/deintercalates lithium ions includes a carbon material. In some embodiments, the carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonization product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

In some embodiments, the material being capable of doping/dedoping lithium may include Si, $SiO_x$ (0<x<2), a Si—C composite, a Si—$Y^1$ alloy (wherein $Y^1$ is selected from an alkali metal, an alkaline-earth metal, Group 13 to Group 16 elements, a transition element, a rare earth element, and a combination thereof, and not Si), Sn, $SnO_2$, a Sn—C composite, a Sn—$Y^1$ alloy (wherein $Y^1$ is selected from an alkali metal, an alkaline-earth metal, Group 13 to Group 16 elements, a transition element, a rare earth element, and a combination thereof, and not Sn), and the like. In some embodiments, at least one of these materials may be mixed with $SiO_2$.

In some embodiments, the element $Y^1$ may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Examples of the transition metal oxide include vanadium oxide, lithium vanadium oxide, and the like.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material such as a metal powder or a metal fiber, and the like of copper, nickel, aluminum, silver, and the like; a conductive polymer such as a polyphenylene derivative, and the like; or a mixture thereof.

In some embodiments, the negative electrode 6 may be manufactured by a method including mixing the negative active material, the conductive material, and the binder in a solvent to prepare a negative active material layer composition, and coating the negative active material layer composition on the current collector.

In some embodiments, the solvent includes N-methylpyrrolidone, and the like, but is not limited thereto.

In some embodiments, the electrolyte includes a non-aqueous organic solvent and a lithium salt.

In some embodiments, the non-aqueous organic solvent serves as a medium for transmitting ions taking part in the electrochemical reaction of a battery. In some embodiments, the non-aqueous organic solvent may be a carbonate-based, ester-based, ether-based, ketone-based, alcohol-based, or aprotic solvent.

In some embodiments, the carbonate based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

Particularly, when the linear carbonate compounds and cyclic carbonate compounds are mixed, an organic solvent having high dielectric constant and low viscosity may be provided. The cyclic carbonate and the linear carbonate are mixed together in a volume ratio ranging from about 1:1 to about 1:9.

In some embodiments, the ester-based solvent may include, for example n-methylacetate, n-ethylacetate, n-propylacetate, dimethylacetate, methylpropionate, ethylpropionate, γ-butyrolactone, decanolide, valerolactone, mevalonolactone, caprolactone, and the like. In some embodiments, the ether solvent may include dibutylether, tetraglyme, diglyme, dimethoxyethane, 2-methyltetrahydrofuran, tetrahydrofuran, and the like, and the ketone-based solvent may include cyclohexanone, and the like. In some embodiments, the alcohol-based solvent may include ethanol, isopropyl alcohol, and the like.

In some embodiments, the non-aqueous organic solvent may be used singularly or in a mixture. When the organic solvent is used in a mixture, the mixture ratio may be controlled in accordance with a desirable battery performance.

In some embodiments, the non-aqueous electrolyte may further include an overcharge inhibitor additive such as ethylenecarbonate, pyrocarbonate, or the like.

In some embodiments, the lithium salt is dissolved in an organic solvent, supplies lithium ions in a battery, basically operates the rechargeable lithium battery, and improves lithium ion transportation between positive and negative electrodes therein.

In some embodiments, the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate, LiBOB), or a combination thereof, as a supporting electrolytic salt.

In some embodiments, the lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator may include any materials commonly used in the conventional lithium battery as long as separating a negative electrode from a positive electrode and providing a transporting passage for lithium ion. In some embodiments, the separator may use materials having a low resistance to ion transportation and an excellent impregnation for an electrolyte. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, the present disclosure is illustrated in more detail with reference to examples.

Furthermore, what is not described in this disclosure may be sufficiently understood by those who have knowledge in this field and will not be illustrated here.

EXAMPLE 1

Preparation of Coating Layer $LiAlTi(PO_4)$ was prepared through the following process. 2.1296 g of $Li_2CO_3$ having purity of 99% and a 40 mesh (Sigma-Aldrich Co., Ltd., St. Louis, Mo.), 6.0200 g of $TiO_2$ having purity of greater than or equal to 99% and having a diameter of 325 μm (Sigma-Aldrich Co., Ltd.), 0.6781 g of $Al_2O_3$ having an activated neutral standard grade and a 150 mesh (Sigma-Aldrich Co., Ltd.), and 17.5685 g of $(NH_4)_2HPO_4$ having the first grade (Shinyo Pure Chemicals Co., Osaka, Japan) were ball-milled and mixed by using a 5 mm zirconia ball for 2 hours.

Subsequently, the mixture was heated at room temperature at a temperature increase rate of 1° C./min up to 700° C., maintained at 700° C. for 2 hour, and naturally cooled down.

Subsequently, the cooled product was ball-milled by using a 5 mm zirconia ball for 19 to 24 hours.

The ball-milled product was heated up to 920° C. at a temperature increase rate of 1° C./min, maintained for 8 hours, cooled down to 300° C. at a speed of 150° C./min, and naturally cooled down.

The $LiAlTi(PO_4)$ obtained through two heat treatments was ball-milled for 48 to 72 hours by using a 5 mm zirconia ball under ethanol. The resulting $LiAlTi(PO_4)$ was added to ethanol to obtain a coating liquid with 30 wt % of solid content of $LiAlTi(PO_4)$ in ethanol.

Manufacture of Rechargeable Lithium Battery Cell $LiCoO_2$ as a positive active material, polyvinylidene fluoride (PVdF) as a binder, and Super-P as a conductive material were mixed in a weight ratio of 94:3:3, and the mixture was dispersed into N-methyl-2-pyrrolidone, obtaining a positive active material layer composition. The positive active material layer composition was coated on a 12 μm-thick aluminum foil, dried, and compressed, forming a positive active material layer.

On the positive active material layer, the above-prepared coating liquid was coated by using a coater, manufacturing a positive electrode with the positive active material layer and the coating layer disposed on the positive active material layer. At this time, the amount of coating layer was 0.2 parts by weight based on 100 parts by weight of the positive active material layer.

The positive electrode and a lithium metal as a counter electrode were used to manufacture a coin-type half-cell. Herein, an electrolyte solution was prepared by mixing ethylene carbonate (EC), dimethyl carbonate (DEC), and diethyl carbonate (DEC) in a volume ratio of 3:4:3 and dissolving 1M $LiPF_6$ in the mixed solution.

COMPARATIVE EXAMPLE 1

A half-cell was manufactured according to the same method as Example 1 except for including no coating layer during the manufacture of the positive electrode.

EVALUATION EXAMPLE

Performance Comparison of Electrolyte Solution

EVALUATION EXAMPLE 1

High-Rate Charge and Discharge Characteristics of cell

Figure 2:
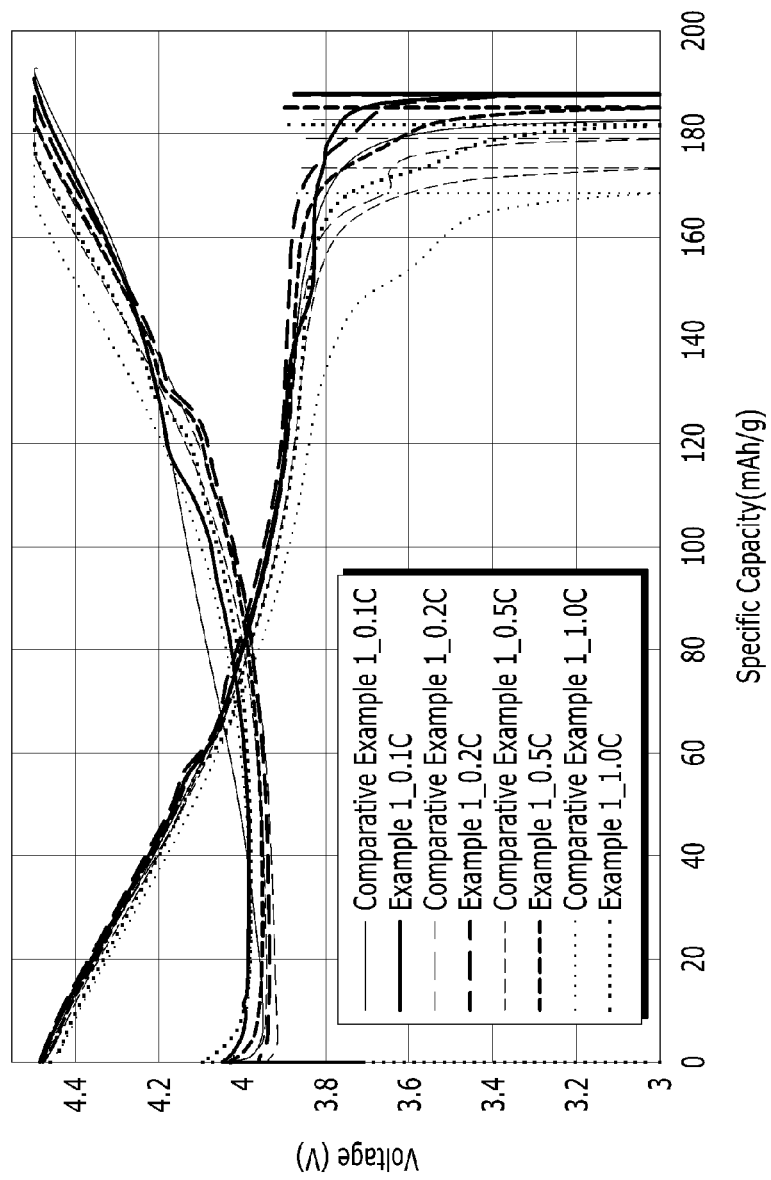
FIG. 2 is a graph showing charge/discharge specific capacity at room temperature (25° C.) of the cells according to Example 1 and Comparative Example 1.
Figure 3:
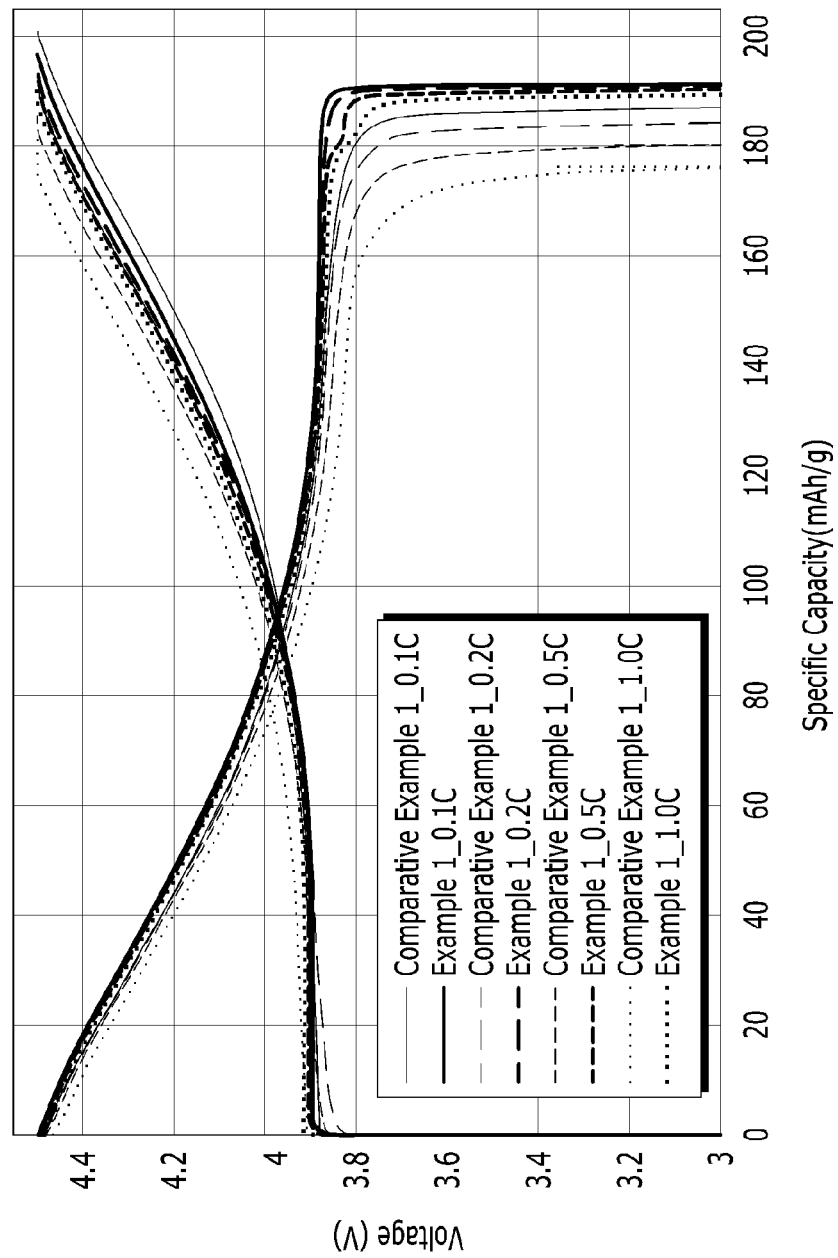
FIG. 3 is a graph showing charge/discharge specific capacity at a high temperature (60° C.) of the cells according to Example 1 and Comparative Example 1.

The half cells according to Example 1 and Comparative Example 1 were charged and discharged under the following conditions, then, high-rate charge and discharge characteristics of the cells were evaluated, and the results are provided in FIGS. 2 and 3.

The high-rate charge and discharge characteristics evaluation was performed at room temperature of 25° C. or a high temperature of 60° C. by performing one cycle of charge/discharge with each current of 0.1 C/0.1 C, 0.2 C/0.2 C, 0.5 C/0.5 C and 1.0 C/1.0 C.

Herein, the upper charge voltage was 4.5V, and the discharge cut-off voltage was 3.8V at the room temperature of 25° C., and the upper charge voltage was 4.5V, and the discharge cut-off voltage was 3.0V at the high temperature of 60° C.

FIG. 2 is a graph showing charge/discharge specific capacity at room temperature (25° C.) of the cells according to Example 1 and Comparative Example 1.

Referring to FIG. 2, the rechargeable lithium battery cell according to Example 1 maintained higher charge/discharge specific capacity than the cell according to Comparative Example 1 and thus, showed high rate cycle-life characteristics.

FIG. 3 is a graph showing charge/discharge specific capacity at a high temperature (60° C.) of the cells according to Example 1 and Comparative Example 1.

Referring to FIG. 3, the cell according to Example 1 maintained higher charge/discharge specific capacity than the cell according to Comparative Example 1 and thus, showed high rate cycle-life characteristic.

EVALUATION EXAMPLE 2

Cycle-Life Characteristic of Electrolyte Solution

The cells according to Example 1 and Comparative Example 1 were charged and discharged under the following conditions, and cycle-life characteristics of the cells were evaluated at room temperature of 25° C. or a high temperature of 60° C. The results are provided in FIGS. 4 and 5.

The cycle-life characteristic evaluation was accomplished by charging and discharging the cells at 2 C, to a 4.5 V charge potential (0.05 C cut-off) and at 2 C, to a 3.0 V discharge potential at room temperature of 25° C. or a high temperature of 60° C., and their capacity retentions (%) were provided.

Figure 4:
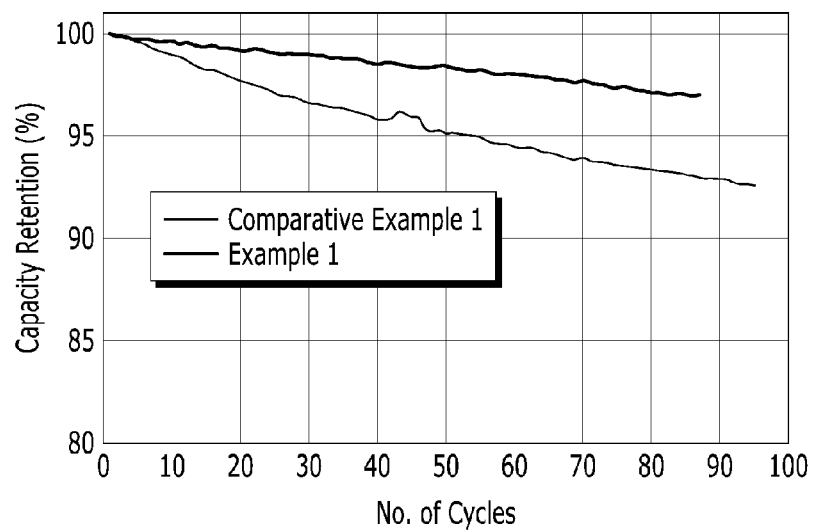
FIG. 4 is a graph showing capacity retention depending on a cycle at room temperature (25° C.) of the cells according to Example 1 and Comparative Example 1.

FIG. 4 is a graph showing capacity retention depending on a cycle at room temperature (25° C.) of the cells according to Example 1 and Comparative Example 1.

Referring to FIG. 4, the cell according to Example 1 showed a little more gently decreased capacity retention than the cell according to Comparative Example 1 and thus, more excellent cycle-life characteristics.

Figure 5:
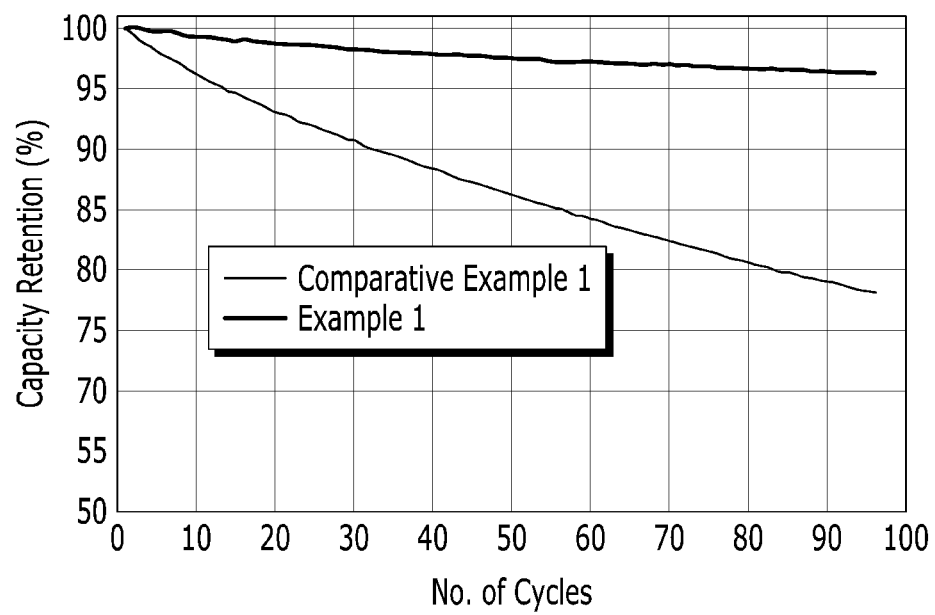
FIG. 5 is a graph showing capacity retention depending on a cycle at a high temperature (60° C.) of the cells according to Example 1 and Comparative Example 1.

FIG. 5 is a graph showing capacity retention depending on a cycle at a high temperature (60° C.) of the cells according to Example 1 and Comparative Example 1.

Referring to FIG. 5, the cell according to Example 1 showed a little more gently capacity retention than the cell according to Comparative Example 1 and thus, more excellent cycle-life characteristics.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. In the present disclosure, the terms "Example," "Comparative Example," and "Evaluation Example" are used arbitrarily to simply identify a particular example or experimentation and should not be interpreted as admission of prior art.

What is claimed is:

1. A positive electrode for a rechargeable lithium battery, comprising
   a current collector;
   a positive active material layer disposed on the current collector; and
   a coating layer disposed on the positive active material layer,
   wherein the coating layer includes a compound represented by Chemical Formula 1:

$$Li_aAl_bTi_c(PO_4)_d \quad \text{Chemical Formula 1}$$

wherein,
   $1.0 \leq a \leq 1.2$, $1.0 \leq b \leq 1.2$, $1.0 \leq c \leq 1.6$, and $1.0 \leq d \leq 2.0$.

2. The positive electrode for a rechargeable lithium battery of claim 1, wherein the coating layer is included in an amount of about 0.1 parts to about 1 part by weight based on 100 parts by weight of the positive active material layer.

3. The positive electrode for a rechargeable lithium battery of claim 1, wherein the positive active material layer comprises a positive active material, a conductive material, and a binder.

4. A rechargeable lithium battery, comprising
   the positive electrode according to claim 1;
   a negative electrode; and
   an electrolyte.

5. The rechargeable lithium battery of claim 4, wherein the coating layer is included in an amount of about 0.1 parts to about 1 part by weight based on 100 parts by weight of the positive active material layer.

6. The rechargeable lithium battery of claim 4, wherein the positive active material layer comprises a positive active material, a conductive material, and a binder.

7. The rechargeable lithium battery of claim 4, wherein the coating layer includes $LiAlTi(PO_4)$.

* * * * *